US008347050B2

(12) United States Patent
Bernstein et al.

(10) Patent No.: US 8,347,050 B2
(45) Date of Patent: Jan. 1, 2013

(54) APPEND-BASED SHARED PERSISTENT STORAGE

(75) Inventors: Philip A. Bernstein, Bellevue, WA (US); Colin W. Reid, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 12/360,122

(22) Filed: Jan. 27, 2009

(65) Prior Publication Data

US 2010/0191919 A1 Jul. 29, 2010

(51) Int. Cl.
G06F 12/16 (2006.01)
(52) U.S. Cl. .................... 711/162; 711/103; 707/622
(58) Field of Classification Search .............. 711/154
See application file for complete search history.

(56) References Cited

U.S. PATENT DOCUMENTS

| | | | |
|---|---|---|---|
| 5,255,387 A | 10/1993 | Arnold et al. | |
| 5,537,574 A | 7/1996 | Elko et al. | |
| 5,619,690 A * | 4/1997 | Matsumani et al. | 1/1 |
| 6,182,121 B1 | 1/2001 | Wlaschin | |
| 6,990,561 B2 | 1/2006 | Yae et al. | |
| 7,003,632 B2 | 2/2006 | Jamil et al. | |
| 7,143,256 B2 | 11/2006 | Maciel | |
| 7,318,110 B2 | 1/2008 | Yumoto et al. | |
| 7,447,709 B1 * | 11/2008 | Rozenman et al. | 1/1 |
| 7,890,726 B1 * | 2/2011 | Falik et al. | 711/163 |
| 2002/0161735 A1 * | 10/2002 | Cheng et al. | 707/1 |
| 2003/0018878 A1 | 1/2003 | Dorward et al. | 711/216 |
| 2006/0101064 A1 * | 5/2006 | Strong et al. | 707/102 |
| 2006/0112150 A1 * | 5/2006 | Brown et al. | 707/201 |
| 2006/0271731 A1 * | 11/2006 | Kilian et al. | 711/108 |
| 2006/0288008 A1 | 12/2006 | Bhattiprolu et al. | |
| 2008/0256292 A1 | 10/2008 | Flynn et al. | |
| 2009/0024578 A1 * | 1/2009 | Wang et al. | 707/3 |
| 2009/0292861 A1 * | 11/2009 | Kanevsky et al. | 711/103 |
| 2010/0010967 A1 * | 1/2010 | Muller | 707/3 |

OTHER PUBLICATIONS

Actel, Application Note AC194, Content-Addressable Memory (CAM) in Actel Devices, Dec. 2003.*
Amiri, et al., "Highly Concurrent Shared Storage", retrieved at <<http://www.pdl.cmu.edu/PDL-FTP/NASD/icdcs.pdf>>, Appears in the Proceedings of the International Conference on Distributed Computing Systems, Taipei, Apr. 2000, pp. 10.
"FusionStor", retrieved at <<http://www.meganet1.com/pdf/atomic.pdf>>, pp. 2.
Houston, "Sanbolic Provides Cost-Effective Shared Storage Solution for Windows Server 2008", retrieved at <<http://www.pressreleasepoint.com/sanbolic-provides-costeffective-shared-storage-solution-windows-server-2008-hyperv-deployments>>, Jul. 8, 2008, p. 1.

* cited by examiner

*Primary Examiner* — Kaushikkumar Patel
(74) *Attorney, Agent, or Firm* — Boswell IP Law; J Mason Boswell

(57) ABSTRACT

A shared storage system is described herein that is based on an append-only model of updating a storage device to allow multiple computers to access storage with lighter-weight synchronization than traditional systems and to reduce wear on flash-based storage devices. Appending data allows multiple computers to write to the same storage device without interference and without synchronization between the computers. Computers can also safely read a written page without using synchronization because the system limits how data can be changed once written. The system may record a log of append operations performed and ensure idempotence by storing a key specified by the caller in the log along with each log entry. The system also provides broadcasts about appended data to computers so that coordination between computers can occur without direct communication between the computers.

19 Claims, 4 Drawing Sheets

APPEND-BASED SHARED PERSISTENT STORAGE

BACKGROUND

Computer systems (i.e., computers) often share storage devices, particularly in enterprise applications, such as over a storage area network (SAN) or using network attached storage (NAS). Sharing storage allows maintenance operations such as backing up data, ensuring hardware redundancy, and so forth to be consolidated for ease of maintenance by information technology (IT) personnel. In addition, shared storage allows computer systems to share data efficiently by storing data in a common location accessible to each computer. Shared storage also increases storage capacity utilization since multiple computer systems share the storage space. Shared storage also enables the possibility of balancing the workload. Since storage is shared, computing tasks can be moved between one computer and another when one computer is overloaded and another is underutilized. Typically, the storage is persistent, meaning that its content survives power failures. The storage is also page-oriented, meaning that the storage device divides data into fixed-size page frames and supports operations to read or write a page in a given page frame. Typical examples of today's storage technology are magnetic disk and flash memory.

Computers access storage devices via a controller, which is usually a special-purpose device whose only function is to read and write data on the storage device. To read from or write to storage, a computer sends a read operation or a write operation to the controller. Currently, the most popular interfaces to storage are based on disk standards, such as SCSI, SATA, and PATA. These interfaces allow the computer to read or write a page frame at a given address.

One popular approach to updating shared storage is to treat storage as a sequential device, where new data is added to the end of a populated region of storage. This is sometimes called "log-structured storage," because it treats storage as if it were a sequential log of pages, even though the underlying technology can support random writes. Log-structured storage is a useful technique for flash memory for two reasons. First, it avoids having to overwrite a page frequently, which is expensive for flash memory because it requires erasing the multipage block that contains the page, which in turn implies that the controller saves other useful pages in the block elsewhere before erasing the block. Second, it helps "wear leveling." That is, it helps ensure that all blocks of storage are erased and rewritten the same number of times. Log-structured storage is also useful for magnetic disks because disks can write data sequentially at a much faster rate than they can write data randomly.

Flash memory and other solid-state memory devices are becoming more popular for use in storage systems due to increased reliability and reduced energy usage due to a lack of mechanical moving parts when compared to disk-based devices. In addition, flash memory can perform random read and write operations at a much higher rate than magnetic disks. The lower latencies due to increased I/O performance also motivate more streamlined synchronization mechanisms. These and other characteristics that flash memory has are quite different than disk-based devices and affect strategies for storing data to flash memory.

One limitation of flash memory is that although it can be read or programmed (i.e., written) a page or partial page at a time in a random access fashion, it can only be erased a block at a time (where each device defines the block size). Where the description herein describes reading and writing a page at a time, those of ordinary skill in the art will recognize that similar principles apply to reading or writing partial pages. Starting with a freshly erased block, a program can write any location within that block. However, once a bit has been set to zero, only by erasing the entire block can it be changed back to one. In other words, flash memory (specifically NOR flash) offers random-access read and write operations, but cannot offer arbitrary random-access rewrite or erase operations. A location can, however, be rewritten as long as the new value's 0 bits are a superset of the over-written value's. For example, an application may erase a nibble value to 1111, and then write the nibble as 1110. Successive writes to that nibble can change it to 1010, then 0010, and finally 0000. In practice, few algorithms take advantage of this successive write capability and in general, applications erase and rewrite the entire block at once or choose a fresh block for writing.

Another limitation is that flash memory has a finite number of write-erase cycles. Most commercially available flash products are rated to withstand around 100,000 write-erase-cycles before the wear begins to deteriorate the integrity of the storage. This effect is partially offset in some chip firmware or file system drivers by counting the writes and dynamically remapping blocks in order to spread write operations between sectors, a technique called wear leveling. Another approach is to perform write verification and remapping to spare sectors in case of write failure, a technique called bad block management (BBM). For portable consumer devices, these wear management techniques typically extend the life of the flash memory beyond the life of the device itself, and some data loss may be acceptable in these applications. For high reliability data storage, however, it is not advisable to use flash memory that has been through a large number of programming cycles. This limitation does not apply to read-only applications such as thin clients and routers, which administrators typically write to once or at most a few times during their lifetime.

Synchronization is a common problem in shared storage systems. It is desirable for each computer system to be able to write when it wants to and read data stored by other computer systems. If multiple computers are allowed to write to log-structured storage, then synchronization is used to ensure consistency with write operations. The synchronization ensures that two computers do not write to the same page frame, which would cause one of the write operations to be overwritten. In the case of flash memory, a write operation that attempts to overwrite a page frame would be lost, since the page frame can only be written once. Synchronization also ensures that there are no holes in the sequence of written page frames. In addition, computer systems may cache data stored in the storage system for faster local access, and the storage system performs steps to ensure cache consistency based on the actions of each computer system.

SUMMARY

A shared storage system is described herein that is based on appending data to a storage device to allow multiple computers to access storage with lighter-weight synchronization than traditional systems and to reduce wear on flash-based storage devices. The shared storage system enforces a convention that does not allow a computer to update data managed by the shared storage system. Using the system, multiple servers can write to the same storage device without interference because rather than servers coordinating to write data to a specified location, servers append data at the next available location without specifying an address. Because a computer cannot write new data to written pages, servers can also safely read a written page without using synchronization that ensures the page does not change during the read operation. The system may record a log of append operations performed by the storage system and ensure idempotence by storing a key specified by the server in the log along with each log entry. The system also provides broadcasts to computers about data appended to storage so that coordination between computers can occur without direct communication between the servers. Thus, the shared storage system provides many advantages for storing data to new types of devices, such as flash-based devices, and for handling concurrent access by multiple computers to a device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
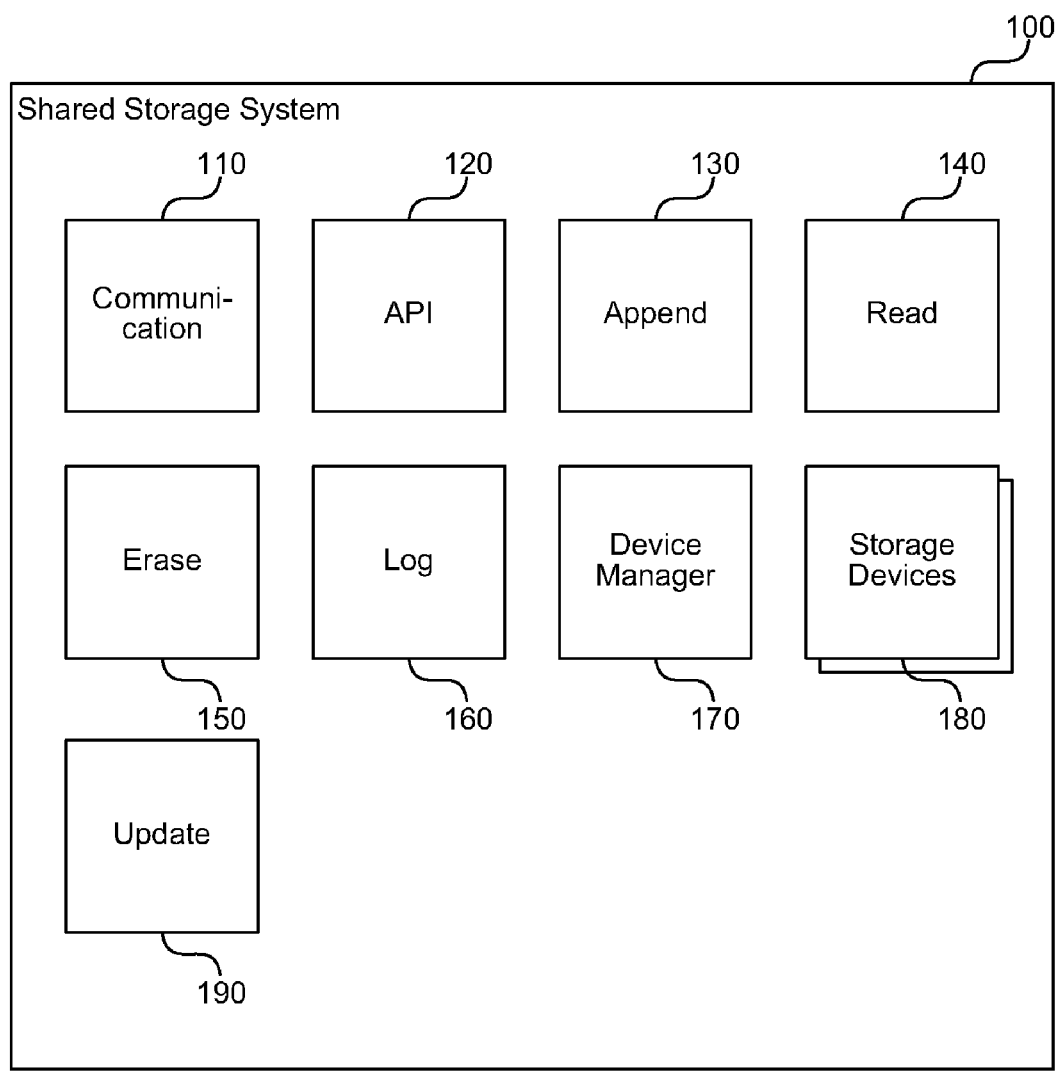
FIG. 1 is a block diagram that illustrates components of the system, in one embodiment.

A shared storage system is described herein that is based on appending data to a storage device to allow multiple computers to access storage with lighter-weight synchronization than traditional systems and to reduce wear on flash-based storage devices. In some embodiments, the shared storage system is implemented in a storage controller device that sits between one or more flash-based storage devices and one or more computers that store data using the system. The shared storage system enforces a convention that does not allow a computer to update a specified location managed by the shared storage system, which leads to many simplifications over traditional systems. Using the system, multiple computers can write to the same storage device without interference because rather than computers coordinating to write data to a specified location, computers append data at the next available location without specifying an address. Because a computer cannot write new data to written page frames, computers can also safely read a written page frame without using synchronization to ensure that the page does not change during the read operation.

The system may record a log of append operations received from computers by the system and ensure idempotence by storing a key specified by the caller in the log along with each log entry. The system also provides broadcasts of appended data or log information about appended data to computers so that coordination between computers can occur without direct communication between the computers. Thus, the system provides many advantages for storing data and for handling conditions of concurrent access by multiple computers to a device. The advantages are especially applicable to flash memory and other types of devices where it is expensive to overwrite already-written storage locations. However, the system can also be used with other nonvolatile storage devices that do allow reads and writes of random locations (e.g., not page aligned) and update-in-place, including newly emerging technologies such as PCM, memristors, and STT-RAM. The system can also potentially be used with shared volatile storage devices, although the use of volatile memory for shared storage is currently not common. Each of these features of the shared storage system is described in further detail herein.

The shared storage system provides an application-programming interface (API) for applications running on computers to invoke to interact with the system. The API uses a logical abstraction for a large unit of physical storage called a segment. For example, a segment could represent a flash chip, a part of a flash chip, or a group of two or more flash chips. Each segment has a segment identifier for distinguishing the segment from other segments. For example, the segment identifier may correspond to a flash chip's network address. Each API operation receives a segment identifier as an input parameter. The API includes operations to append a page to a segment and return the appended page's address, read a page at a given address, get the last populated page of a segment, and erase a segment. Unlike traditional storage systems, the API does not include an operation to destructively update a page at a given address.

When a caller wants to write data to the shared storage system, the caller invokes the system's append API specifying a page of data to append to a segment. This operation adds the data to the next available page frame in the storage device and sets an indication of the next available page frame (e.g., by incrementing a counter) for the next append operation. The shared storage system uses locks and other common techniques to ensure that each append operation is atomic, meaning that it completes all of the steps to keep the storage device in a known state and when the operation completes the storage device is ready for the next append or other operation. The system processes append operations serially, ensuring that pages are written to the storage medium in a log-structured manner and that each page is written to the next available page frame with no holes in the sequence (although guaranteeing no holes when a block or page fails may involve higher level algorithms not described here). Regardless of how many computers are appending data to the shared storage system, each computer can do so without knowing about or coordinating with the other computers. This involves dramatically less synchronization overhead than is used in traditional systems. In some embodiments, the system also handles bad blocks reported by or detected within a storage device by skipping the address of a bad block and appending data to the next available block.

Reading data is similarly straightforward. When a caller writes data to the shared storage system using the append API, the system returns the address where the data was written as a return parameter. When the caller later wants to read the data, the caller invokes the system's read API with the address and the system responds with the data. Just as with writing, many computers can read data from the shared storage system at the same time, and the system ensures that the requests are handled in a way that maintains consistency in the underlying storage device. Note that because the shared storage system typically updates page data by writing a new page, there is a reduced reason to protect the existing page with synchronization mechanisms such as critical sections or read/write locks. Once a page is written, it does not change unless it is completely erased, so a reader is not in danger of interference by other computers writing updates to the page.

FIG. 1 is a block diagram that illustrates components of the system, in one embodiment. The shared storage system 100 includes a communication component 110, an API component 120, an append component 130, a read component 140, an erase component 150, a log component 160, a device manager component 170, one or more storage devices 180, and an update component 190. Each of these components is described in further detail herein.

The communication component 110 sends and receives communications over a network between the shared storage system 100 and one or more computers that store data with the shared storage system 100. The communication component 110 may include network hardware, such as a network interface card (NIC), and a network stack that provides common protocols, such as TCP/IP and UDP. The hardware may include redundant NICs for communicating with computers along multiple communication channels in case one channel fails and/or for increased efficiency.

The API component 120 provides an application interface that computers can invoke over the network using a predefined protocol. The API component 120 provides operations including append page, read page, and erase page, that computers can use to store and read data from the shared storage system 100. The API component 120 may provide other common application interfaces including a web service interface or an administrative interface for an administrator to maintain the shared storage system 100.

The append component 130 handles append operation requests received from computers. The append component 130 receives an append request, retrieves the next page frame location, stores data from the append request to the next page frame location, and increments the next page frame location. If the operation completes successfully, the append component responds to the request by providing the address at which the append component 130 stored the page. The append component may also provide the result of the append operation to the log component to store as a record of the operation and for idempotence as described further herein.

The read component 140 handles read operation requests received from computers. A computer can read a page of stored data by providing the address of the stored data through the API component 120 to the read component 140. The read component 140 locates the requested page frame, reads the data from the page frame, and composes a response to the requestor containing the requested data.

The erase component 150 handles erase operation requests received from computers. A computer cannot modify pages when the storage is based on flash memory devices other than by erasing a whole block that is typically comprised of page frames (e.g., NAND devices often only allow erasing in blocks of ~64 page frames). The computer may erase a block when the storage device is full or when the computer has a reason for updating a page without writing a new page. In some embodiments, the shared storage system 100 handles erasing blocks when available storage is low and does not externally expose the erase component 150. Since tracking live data with fine granularity can be costly, the erase component 150 may wait until it can erase large, contiguous regions of blocks (and often the whole chip) at once.

The log component 160 stores a log of each successful append operation so that computers can verify whether a computer has already written data corresponding to a key. The log entry of a successful append operation includes the address of the page frame where the appended data was stored. For example, if a computer fails while writing data the computer may not know if the shared storage system 100 received the data successfully. In that case, the computer may request to write the data again. To enable the storage system 100 to detect duplicate append operations, each append specifies a key that distinguishes the data from other data written to the shared storage system 100. Before appending data, the append component 130 may look up the key in the log to determine whether the computer has previously written the data. If the caller has previously written the data, then the log component 160 provides the address of the written data and the append component 130 can respond to the request without re-appending the data by replying with the address at which the append component 130 previously stored the data.

The device manager component 170 manages the storage devices 180 associated with the system. The device manager component 170 may route requests received from the other components to an appropriate storage device based on a segment identifier or other information received in an operation request. The device manager component 170 receives notifications when storage devices are added to and removed from the system and takes steps to expose the storage devices for use by callers of the shared storage system 100.

The storage devices 180 may include one or more flash memory chips, solid state disks, magnetic disks, optical disks, disk arrays, SANs, or combinations of storage device types. The storage devices 180 are typically persistent and thus store data across power cycles.

The update component 190 provides updates about data written to the storage devices 180 to interested computers. The interested computers may include all of the computers, in which case the update component 190 may broadcast the data or summary information about the data (e.g., the address to which the data was written and the associated key). In some embodiments, the caller specifies in an append request whether the data to be appended is to be broadcast and if so to which other computers. For example, the request may include a multicast address or list of computers that will receive updates about the written data.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
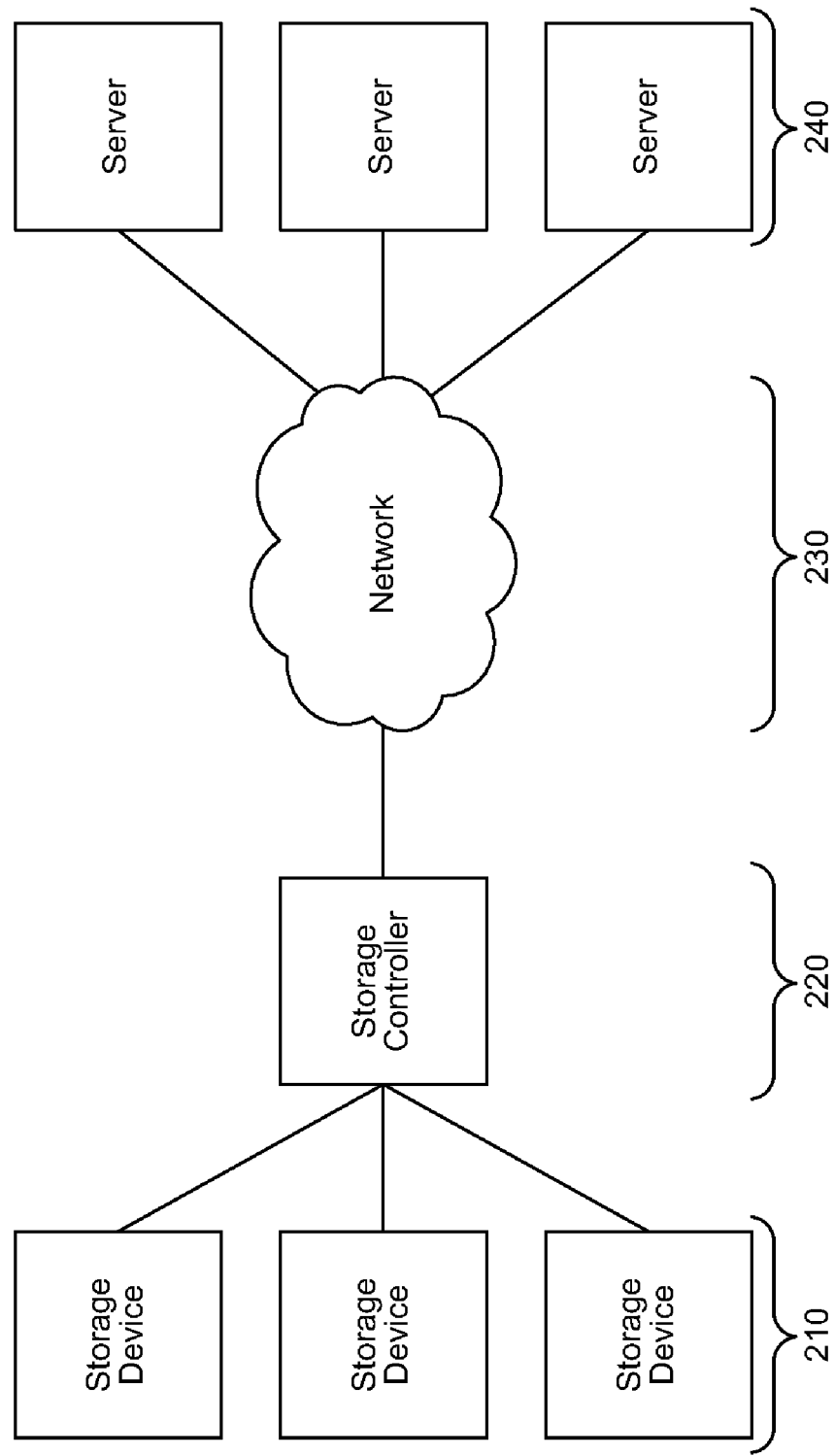
FIG. 2 is a block diagram that illustrates an environment in which the shared storage system is used, in one embodiment.

FIG. 2 is a block diagram that illustrates an environment in which the shared storage system is used, in one embodiment. The environment includes one or more storage devices 210, a storage controller 220, at least one network 230, and one or more computers 240. The storage devices store data and can include any type of storage device. The storage controller 220 enforces the conventions established by the shared storage system and ensures that the computers 240 access the storage devices 280 in a manner that is consistent with the processes described herein. In some embodiments, the environment includes more than one storage controller 220 handling operations between computers 240 and the storage devices 210. The network 230 connects the one or more computers 240 to the storage controller 220, and can include any type of network as well as multiple redundant networks, additional network hardware (e.g., switches and routers), and so forth. The computers 240 include any type of computing device that stores data to a shared storage location.

Idempotence

In some embodiments, the shared storage system provides idempotent storage by receiving a key from a caller with each data page to append to the storage device. When the caller writes the same data, it specifies the same key. The system places the key in a log along with the success or failure of the append operation. If the caller attempts to append the data again, the system looks up the key in the log and can provide a failure response or return the address of the written data (which may also be stored in the log) to the caller. In computer science, the term idempotent is used to describe methods or subroutine calls that produce the same effect whether they are invoked once or many times. Thus, idempotent methods can safely be called multiple times, as invoking the procedure a single time or multiple times results in the system maintaining the same state. The append operation is idempotent because repeated calls to store the same data (as defined by the specified key) will result in at most one page being written to the storage device. If the page is successfully written, then every call of the append operation after the first successful one will return the same address of the stored data.

One situation in which idempotence is helpful involves malfunctions of the system, either in a storage controller at the storage device, at a computer that stores data with the system, or within the network connecting the two. Due to such malfunctions, it is possible that a caller (e.g., a server) sends an append operation to a controller and does not receive a reply, either because the operation did not execute or the reply message got lost. In the former case, the caller would like to re-execute the append operation. In the latter case, the caller would like to receive another copy of the reply. The problem is that the caller does not know which case occurred without help from the storage controller to take the appropriate action. Using the key and idempotence described above, the caller can solve this problem by simply resending the append operation with the same key whenever the caller fails to receive a reply. In the former case, the controller will execute the operation again. In the latter case, the controller will return the result of a previous successful execution of the operation.

The shared storage system selects keys in such a way that there is negligible probability that two different pages that are received by the system within a certain period have the same key. The period is the amount of time it takes to execute N append operations, where N is the number of entries in the log. This ensures that the controller will not be fooled into thinking that two different pages are the same because they have the same key. For example, the system may use a 128-byte globally-unique identifier (GUID), a cryptographic hash of the appended state, a sequence number, and so forth.

Because append operations are idempotent, a caller can increase the likelihood that an append operation will execute successfully by sending the operation request multiple times. For example, if there are two communication links that connect the computer to the storage controller (e.g., redundant networks), then the computer can eagerly send the append operation on both links. This approach reduces the latency of the operation, since the computer will receive a reply from whichever operation executes first. It also decreases the chances that the computer will fail to receive a reply, since both append operations would have to malfunction for that to occur.

In some embodiments, the shared storage system limits idempotence based on storage limitations. For example, the log may have a fixed size and may wrap around so that when the log is full, the system begins recording new append operations at the top of the log thereby overwriting previous log entries. The size of the log and the rate at which the system receives append operations determine the duration over which the log can ensure idempotence. If a caller attempts to store the same data after a log entry for a prior append operation of the data has been overwritten, the system will not know that the second request is a duplicate and will write the data again to a new address. The system may allow administrators to tune the size of the log to ensure that idempotence can be guaranteed for a length of time sufficient for the administrator's intended use of the system.

In some embodiments, the shared storage system informs a caller when an append operation cannot be guaranteed to be idempotent. For example, the caller may provide an address parameter with an append operation that is the highest address for which the caller received a successful reply to an append operation. Highest as used here refers to the most recent address to which an append operation appended data, and lowest refers to the oldest such address. Those of ordinary skill in the art will recognize that if the storage device wraps (e.g., becomes full and starts storing again from the top), that later-written address may end up being lower in numeric value than earlier-written addresses. When the system receives the address, if the append operation is not in the log, then the system compares the received address to the lowest address in the log. If the received address is higher than the lowest address in the log, then the system knows that the log has not been overwritten and can guarantee idempotence. If the received address is lower than the lowest address in the log, then the log has been overwritten and the system cannot guarantee idempotence. Depending on the caller's intended use of the data, this information may help the caller decide how to respond to a particular situation. If the caller sends an append request multiple times, the caller uses the same address parameter in each request to ensure that the system can detect a breakage of the idempotence guarantee.

In some embodiments, if the log does not include the received address, then the shared storage system returns an error that includes the smallest address in the log. This tells the caller that the system does not know whether the append operation previously executed, but if the operation did execute, the page is in a page frame between the received address and the lowest address in the log returned with the error. If the caller wants to verify whether the append operation previously executed, the caller can find out by reading the pages within that range of addresses.

Concurrency Bound

Another problem with the append operation is that a caller does not know the address in which a page will be stored until after the shared storage system appends the page and returns the page's address to the caller. This causes a problem if the caller wants to store a pointer to a page before the caller stores the page itself. For example, suppose a computer wants to store two pages, P1 and P2, and that P1 is to be written to storage before P2. Furthermore, suppose it is relevant for the content of P1 to include a pointer to P2. If append is the only operation that can be used to update storage, then it is difficult to include a pointer to P2 in P1.

In some embodiments, the shared storage system allows a caller to specify a range of storage device addresses (e.g., a concurrency bound) in which the caller wants data to be stored. Callers use the range, for example, in a situation where the caller wants to write parent data before child data. Until the caller appends the child, the caller will not receive the address where the child was stored from the system, but the caller wants to embed a reference to the child in the parent. To get around this, the caller can embed a range of addresses (e.g., 0 to 1000) in the parent data page, write the parent page, and then request that the child page be written within the range specified in the parent page. If all of the operations succeed, then the caller can later find the child by performing a search based on the range stored in the parent. If for some reason the shared storage system cannot satisfy the request to write the child page to the specified range, then the caller can attempt the operation again (first writing the parent, then the child) in a new range.

In some embodiments, the shared storage system expresses the concurrency bound as a page frame address and an extent. The page frame address is the next page frame address beyond the last written page frame seen by the caller (e.g., in the reply to a previous append operation). The extent is the number of page frames in the concurrency bound. The concurrency bound can also be expressed as a lower page frame address and an upper page frame address, though in most cases this approach is less efficient since it uses more bits. In either case, the page frame address can be an index from which the system can calculate the actual address. For example, the page frame index 37 refers to the 37th page frame in storage, whose address is 37 times the number of bytes per page. Alternatively or additionally, the caller can use the idempotence address parameter described herein as the lower bound of the concurrency bound and then select an extent.

In some embodiments, the shared storage system periodically sends (e.g., via broadcast) a high water mark that indicates the address at which the system will write the next received data. Callers can use this information in determining a range to specify for a range-bounded request. For example, if the current high water mark is 0x1000 blocks, and the caller is willing to search 256 blocks, then the caller may specify a range from 0x1000 to 0x1100. Callers can also determine an estimate of the high water mark by noting the address received from the system for the last data written by the caller. As long as the caller writes data frequently, the most recent address will be close to the high water mark. Alternatively or additionally, the caller may query the shared storage system to determine the most recently populated page.

Distributing Changes

When multiple computers share storage, it is often desirable for each computer to be informed of updates made to storage by other computers. This may be relevant for a variety of reasons. One reason is to keep the cache memories of the computers mutually consistent (known as "cache coherence"). Another reason is for all computers to maintain an up-to-date copy of shared data. For example, if the computers are writing to a shared log, they may all use the content of the tail of the log.

In some embodiments, the shared storage system broadcasts appended data or summary information about appended data to each of the computers that share the system. For example, the system may periodically inform each computer of the data written to the storage device since the last period. Computers can use this information to coordinate with each other without sending messages directly peer-wise between the computers. In some embodiments, the shared storage system receives a flag or other indication with each append operation indicating whether to broadcast information about the append operation to other computers. In this way, the system can save network bandwidth by allowing a computer to keep data that only that computer is using from being broadcast while still broadcasting data that may be of shared interest to other computers. This topology also simplifies the communication between the computers, because an administrator only has to ensure that the shared storage system can communicate with each computer, rather than worrying about whether each computer can communicate with each other computer. Callers can operate completely unaware of how many other computers are sharing the data and without the data overhead common in traditional systems for tracking routing information at each caller for each other computer.

Alternatively or additionally, each caller may broadcast updates when a response to an append operation is received and the address to which the shared storage system stored the data is known to the caller. However, this approach may be less efficient because it introduces extra delay because the caller waits until it receives the result from the system to send the append information to other computers.

In some embodiments, the shared storage system does not include the appended data in the summary sent to other computers (e.g., to save bandwidth). Interested computers can then individually issue a read operation to access the data. Alternatively or additionally, the caller can send the initial append via broadcast to all computers as well as to the shared storage system and the shared storage system can broadcast replies that include the address to which the system stored the data.

In some embodiments, the shared storage system receives a parameter from the caller that indicates whether the result of the append operation is broadcast by the system. It may not be relevant for the result of all storage operations to be broadcast to all computers. In this case, it is beneficial to include a parameter to the append operation that indicates to the system whether to broadcast the result to all computers. In cases where it is desirable to broadcast the result of the append operation, the result may nevertheless not be relevant to all computers, but rather only those that are known to have an interest in the data that was appended. In this case, the caller may include an additional parameter, such as a multicast routing address, that identifies the computers to which the system will send the result of the append operation.

Figure 3:
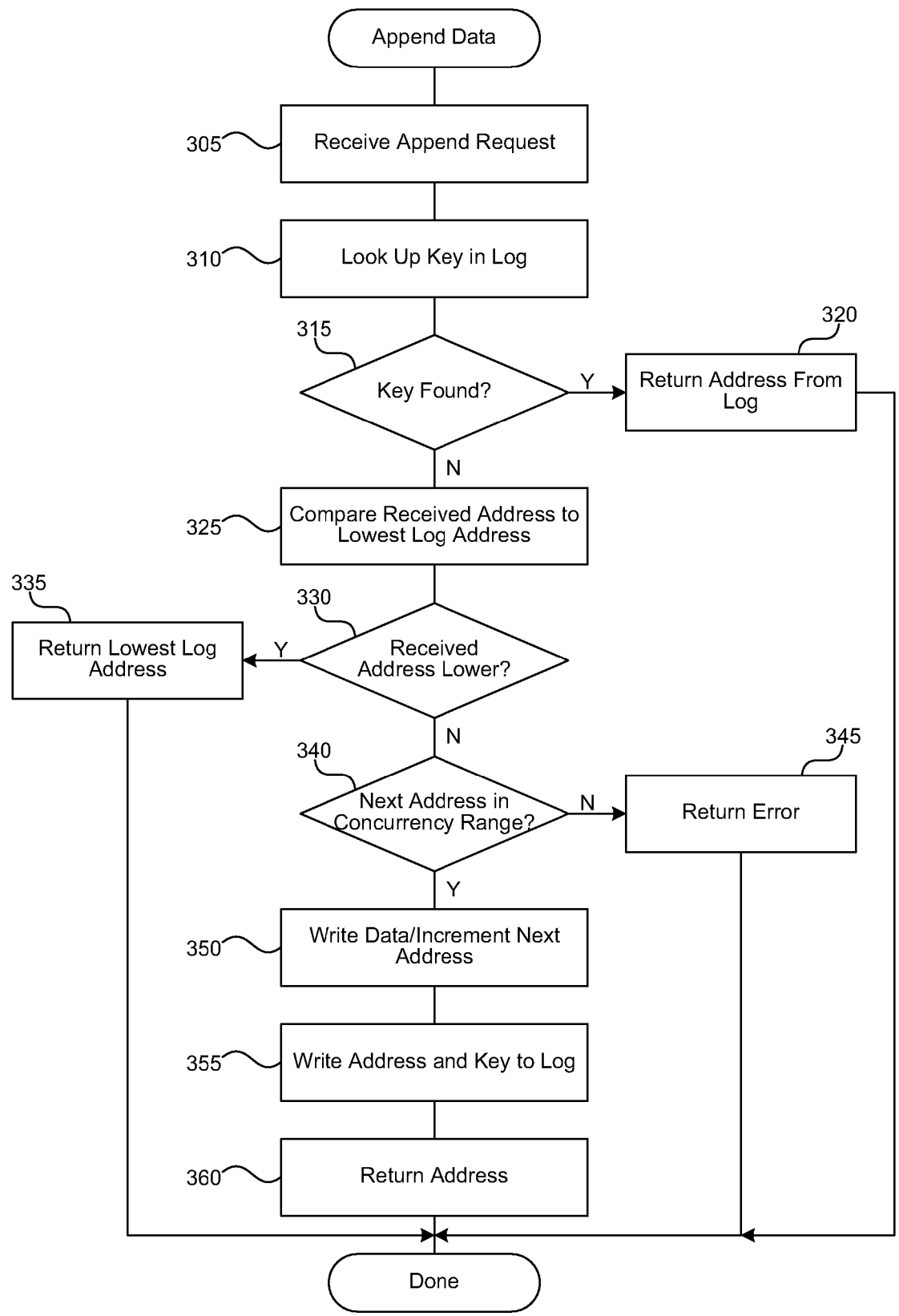
FIG. 3 is a flow diagram that illustrates the processing of the append component of the shared storage system to append new data to a storage device, in one embodiment.

FIG. 3 is a flow diagram that illustrates the processing of the append component of the shared storage system to append new data to a storage device, in one embodiment. In block 305 the component receives a request from a caller (e.g., a server or other computing device) to store data to the storage device. The request specifies an append operation and does not specify an address to which to store the data. The request may also include a key that distinguishes the data from other data, an address returned to the caller by a previous append operation, and a concurrency range within which the caller requests storage of the data. Continuing in block 310, the component looks up the key in a log of previous append operations that includes pairs of keys and addresses where data associated with the keys is stored. For example, the system may store the log as a hash table or other data structure suitable for quickly looking up keys and associated data.

Continuing in decision block 315, if the component finds the key in the log, then the component continues at block 320, else the component continues at block 325. In block 320, the component returns the address to which the component previously wrote the data from the log and then completes. If the request specifies a concurrency range, then the component checks the concurrency range before returning the address from the log to determine whether the address in the log is outside the specified range. If the address is outside the range, then the component may store the data again within the concurrency range or return an error to the caller. In block 325, the component compares the received address to the lowest address stored in the log. Continuing in decision block 330, if the received address is lower than the lowest address stored in the log, then the component continues at block 335, else the component continues at block 340. In block 335, the component returns the lowest address stored in the log and completes. Continuing in decision block 340, if the next address to which the component will append data is not within the concurrency range specified in the request, then the component continues at block 345, else the component continues at block 350. In block 345, the component returns an error indicating that the component cannot satisfy the concurrency request and then completes.

In block 350, the component writes the data in the request to the next address and increments the next address. Continuing in block 355, the component writes the address to which the component wrote the data and the key specified in the request to the log. Continuing in block 360, the component returns the address to which the component wrote the data to the caller. After block 360, these steps conclude.

Figure 4:
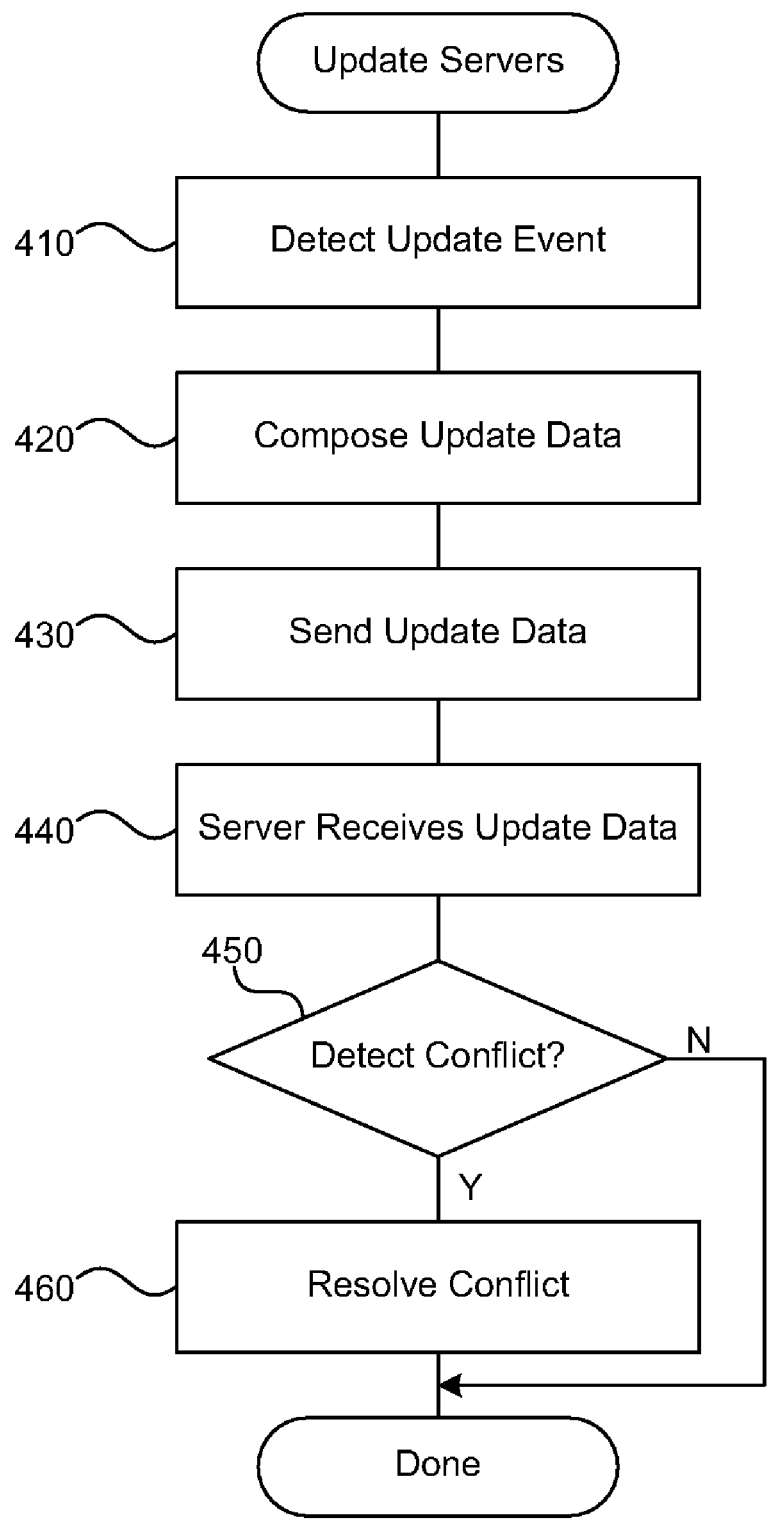
FIG. 4 is a flow diagram that illustrates the processing of the update component to distribute updated data to computers within the system, in one embodiment.

FIG. 4 is a flow diagram that illustrates the processing of the update component to distribute updated data to computers within the system, in one embodiment. In block 410, the component detects an update event that signals that there is new data with which to update computers within the system. For example, the update event may include a caller sending an append request with an update or broadcast flag set. The event may also include a timer that fires periodically to send information about append operations performed since the last firing of the timer. Continuing in block 420, the component composes the update data, which may include the appended data, an address where the appended data was stored, a key associated with the data, the caller that submitted the append request, and other information about the appended data. Continuing in block 430, the component sends (e.g., via broadcast) the composed update data to the interested set of computers (e.g., all servers or a subset).

Continuing in block 440, a computer receives the update data via the network and examines the append operations specified in the update data to determine whether an append operation of the computer conflicts with other append operations specified in the update data. For example, two computers may attempt to update shared data that refers to a shared data structure at the same time. Continuing in decision block 450, if the computer detects conflicts, then the component continues at block 460, else the component completes. Continuing in block 460, the component resolves the conflict. For example, the computer may determine whether it won the conflict, and if it lost resolve the conflict by incorporating the conflicting computer's changes and retrying the append operation. After block 460, these steps conclude.

From the foregoing, it will be appreciated that specific embodiments of the shared storage system have been described herein for purposes of illustration, but that various modifications may be made without deviating from the spirit and scope of the invention. For example, although computers have been described generically as users of the shared storage system, a variety of device types can be use the system to share data with similar or different devices, including servers, clients, desktop computers, mobile devices, embedded devices, and so forth. Accordingly, the invention is not limited except as by the appended claims.

We claim:

1. A computer-implemented method for synchronized, shared access to a storage device, the method comprising:
   receiving a request from a caller to store data to the storage device, wherein the request specifies an append operation and does not specify an address to which to store the data, wherein the append operation adds the data at a next available storage location and does not permit random access storage, wherein the request includes a concurrency range within which the caller requests storage of the data;
   writing the data in the request to a next available address so that multiple callers can write data to the storage device at the same time without synchronizing with one another, wherein the next available address is a sequential storage address of the storage device that is subsequent to a previously written address;
   if the next address to which the storage device will append data is not within the concurrency range specified in the request, returning an error indicating that the concurrency range cannot be satisfied;
   incrementing the next available address for subsequent append operations;
   returning the address to which the data was written to the caller,
   wherein the preceding steps are performed by at least one processor.

2. The method of claim 1 wherein the request includes a key that distinguishes the data from other data and further comprising writing the address to which the data was written and the key specified in the request to a log of append operations.

3. The method of claim 2 further comprising:
   before writing the data, looking up the key in the log of append operations that includes pairs of keys and addresses where data associated with the keys is stored; and
   if the key is found in the log, returning the address from the log.

4. The method of claim 1 wherein the request includes an address returned to the caller by a previous append operation, and further comprising:
   before writing the data, comparing the received address to a lowest address in any log entry stored in a log of previous append operations; and
   if the received address is lower than the lowest address stored in the log, returning the lowest address stored in the log to the caller.

5. The method of claim 1 wherein the storage device is a flash-based memory device that exhibits wear when data is erased.

6. A computer system for sharing one or more storage devices among multiple computers, the system comprising:
   a processor and memory configured to execute software instructions;

a communication component configured to send and receive communications over a network between the system and one or more computers that store data with the system;

an application-programming interface (API) component configured to provide an application interface that computers can invoke over the network using a predefined protocol for appending pages to the storage devices;

an append component configured to handle append operation requests received from computers through the API component, wherein handling append operation requests includes receiving an append request, retrieving a next page location, storing data from the append request to the next page location, and incrementing the next page location so that multiple callers can write data to the storage devices at the same time without synchronizing with one another, wherein each request includes a concurrency range within which a caller requests storage of the data, and if the next page location to which the append component will append data is not within the concurrency range specified in the request, returning an error indicating that the concurrency range cannot be satisfied;

a device manager component configured to manage the storage devices associated with the system; and one or more storage devices that provide persistent storage.

7. The system of claim 6 wherein the communication component includes redundant network interfaces for communicating with computers along multiple communication channels and wherein the append component is further configured to receive at least some requests concurrently on multiple communications channels sent redundantly from the same computer.

8. The system of claim 6 further comprising a log component configured to store a log of each successful append operation so that computers can verify whether a computer has already written data corresponding to a key specified in an append request.

9. The system of claim 6 wherein the append component is further configured to respond to the append request by providing the address at which the append component stored the page.

10. The system of claim 6 further comprising a read component configured to handle read operation requests received from computers, wherein a computer can read a page of stored data by providing the address of the stored data through the API component to the read component.

11. The system of claim 6 further comprising an erase component configured to handle erase operation requests received from computers, wherein a computer cannot modify pages except by erasing a whole page.

12. The system of claim 6 wherein the append component is further configured to check the log component for an entry with a key matching the key in the append request before writing the data.

13. The system of claim 6 wherein the device manager component is further configured to route requests received from other components to an appropriate storage device based on a segment identifier received in an operation request.

14. The system of claim 6 further comprising an update component configured to provide updates about data written to the storage devices to computers sharing the storage devices.

15. The system of claim 14 wherein an append request specifies whether the update component sends information about the append request to computers sharing the storage devices.

16. A computer-readable storage medium comprising instructions for controlling a computer system to distribute updates of a storage device to multiple computers sharing the storage device, wherein the instructions, when executed, cause a processor to perform actions comprising:

detecting an update event that signals that there is new data with which to update the computers;

composing update data, wherein the update data includes an address at which the new data is stored in the storage device, wherein previously received requests to store data included a concurrency range within which a caller requests storage of the data, and if the address to which the storage device appended data was not within the concurrency range specified in the request, an error was returned indicating that the concurrency range could not be satisfied; and sending the composed update data to the multiple computers, wherein each of the computers coordinates sharing of the storage device by receiving the update data and without communicating directly with the other computers, wherein the update data includes information that a receiving computer can use to determine whether an append operation of the receiving computer modifies a data structure shared with other computers through the shared storage device.

17. The computer-readable medium of claim 16 wherein the detected update event comprises receiving an append request with an update indication set that indicates whether information about the append request is sent to other computers.

18. The computer-readable medium of claim 16 further comprising if the receiving computer determines that an append operation of the receiving computer modifies a data structure shared with other computers through the shared storage device after another computer modified the shared data structure, retrying the append operation.

19. The computer-readable medium of claim 16 further comprising receiving a request to read the new data from the storage device, wherein the request to read includes the address at which the new data is stored.

* * * * *